US010878582B2

(12) United States Patent
Rampal

(10) Patent No.: US 10,878,582 B2
(45) Date of Patent: Dec. 29, 2020

(54) IMAGE PROCESSING DEVICE, IMAGE PROCESSING METHOD AND STORAGE MEDIUM STORING PROGRAM FOR TRACKING AN OBJECT

(71) Applicant: NEC Corporation, Tokyo (JP)

(72) Inventor: Karan Rampal, Tokyo (JP)

(73) Assignee: NEC Corporation, Tokyo (JP)

(*) Notice: Subject to any disclaimer, the term of this patent is extended or adjusted under 35 U.S.C. 154(b) by 84 days.

(21) Appl. No.: 15/510,488

(22) PCT Filed: Sep. 11, 2014

(86) PCT No.: PCT/JP2014/004705
§ 371 (c)(1),
(2) Date: Mar. 10, 2017

(87) PCT Pub. No.: WO2016/038647
PCT Pub. Date: Mar. 17, 2016

(65) Prior Publication Data
US 2017/0286801 A1 Oct. 5, 2017

(51) Int. Cl.
G06T 7/246 (2017.01)
(52) U.S. Cl.
CPC .................... G06T 7/251 (2017.01)
(58) Field of Classification Search
CPC .............................. G06K 9/621; G06T 7/344
USPC ........................................................ 382/159
See application file for complete search history.

(56) References Cited

U.S. PATENT DOCUMENTS

2004/0208341 A1* 10/2004 Zhou .................... G06K 9/3216
382/103
2007/0036429 A1 2/2007 Terakawa
2009/0002489 A1 1/2009 Yang et al.
(Continued)

FOREIGN PATENT DOCUMENTS

JP 2007-47965 2/2007
JP 2011-60038 3/2011

OTHER PUBLICATIONS

F. Zhou et al., Exemplar-based graph matching for robust facial landmark localization, International Conference on Computer Vision, Dec. 2013.
(Continued)

Primary Examiner — Justin P. Misleh
(74) Attorney, Agent, or Firm — Finnegan, Henderson, Farabow, Garrett & Dunner, L.L.P.

(57) ABSTRACT

An image-processing device performing: extracting features from a target image based on a shape, the shape including sub parts each being a group of feature points each being correlated with a position within an object; deriving an estimated shape by applying a global model to an initial shape, the global model representing a relation between one of the features extracted and a motion of the initial shape; detecting, in the sub parts, an occluded sub part by comparing an estimated shape derived from a previous image and an estimated shape derived from a current image; and generating a final output shape by combining estimated shapes each derived by applying local models to the initial shape, the local models each representing a relation between the feature and a motion of a sub part in the sub parts and each restricting a motion of at least one of the sub parts.

10 Claims, 10 Drawing Sheets

(56) References Cited

U.S. PATENT DOCUMENTS

| | | | | |
|---|---|---|---|---|
| 2009/0141940 A1* | 6/2009 | Zhao | ............... | G06K 9/00295 |
| | | | | 382/103 |
| 2013/0094768 A1* | 4/2013 | Ye | ............... | G06K 9/6209 |
| | | | | 382/199 |
| 2015/0110349 A1* | 4/2015 | Feng | ............... | G06K 9/00234 |
| | | | | 382/103 |

OTHER PUBLICATIONS

J.M. Saragih et al., "Deformable model fitting by regularized landmark mean-shift", International Journal of Computer Vision, vol. 91, No. 2, Jan. 2011.

X.P. Burgos-Artizzu et al., "Robust face landmark estimation under occlusion", International Conference on Computer Vision, Dec. 2013.

Shogo Kawai et al., "Evaluation of image local features for the improvement of face tracking accuracy", IEICE Technical Report PRMU2013-168-PRMU2013-214 Pattern Recognition and Media Understanding, vol. 113, No. 493, The Institute of Electronics, Information and Communication Engineering, pp. 197-202, Mar. 2014.

International Search Report and Written Opinion dated Nov. 25, 2014, in corresponding PCT International Application.

* cited by examiner

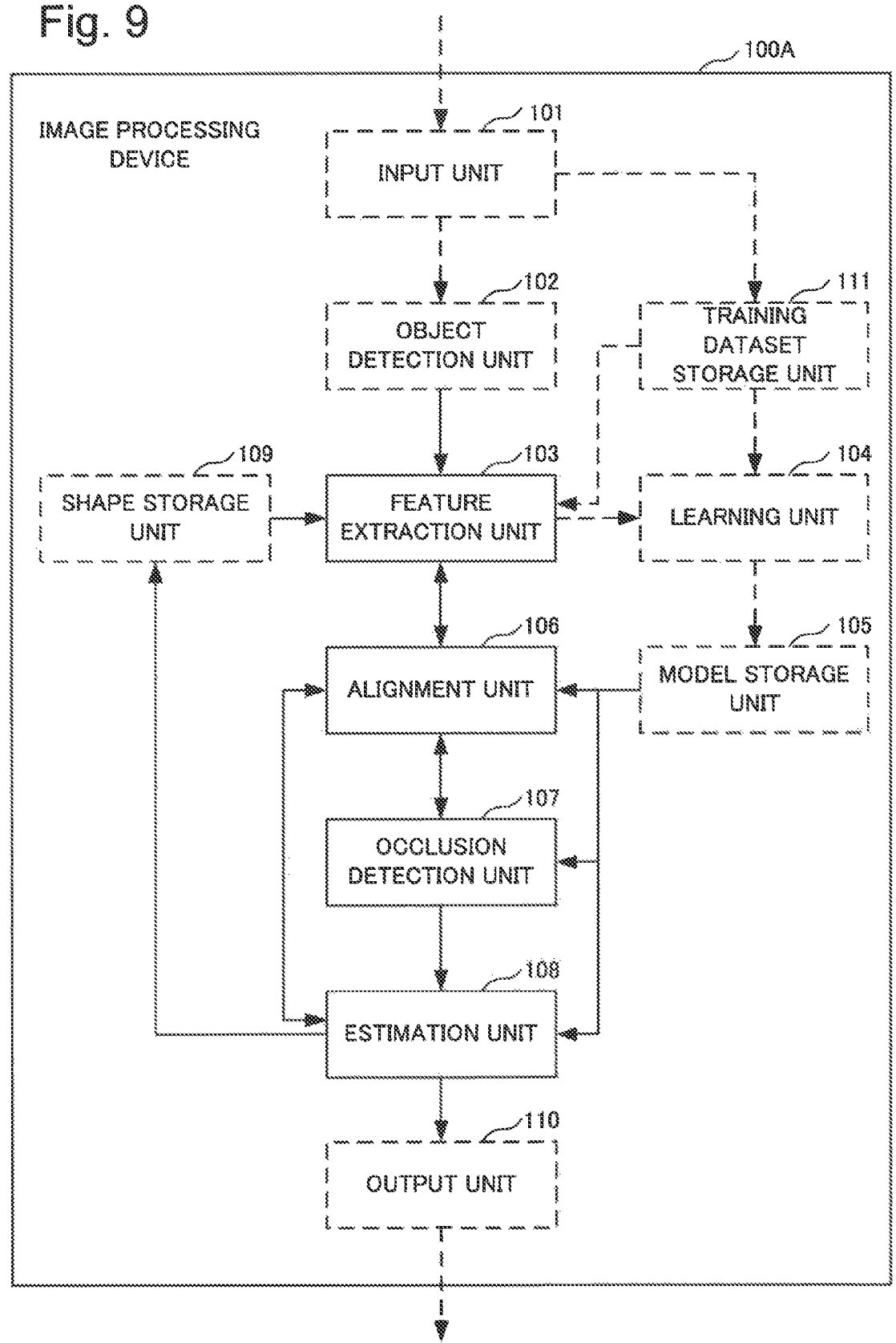

IMAGE PROCESSING DEVICE, IMAGE PROCESSING METHOD AND STORAGE MEDIUM STORING PROGRAM FOR TRACKING AN OBJECT

CROSS-REFERENCE TO RELATED PATENT APPLICATION

This application is a National Stage Entry of International Application No. PCT/JP2014/004705, filed Sep. 11, 2014. The entire contents of the above-referenced application are expressly incorporated herein by reference.

TECHNICAL FIELD

The present invention relates to image processing technology, and more particularly to image processing technology of tracking feature points.

BACKGROUND ART

Tracking objects in videos has much practical importance such as in surveillance. One of the methods of tracking is realized by regression of a shape, where the shape is defined by the feature points. Discriminative learning approaches can be used to learn relation between a shape of an object to be tracked and features of an image. Features here can be local, i.e., extracted around the feature points or global, i.e., extracted from an area, for example, including a plurality of feature points. Generally a prediction of shape is done in a cascade manner, where each cascade predicts a shape increment which along with an initial shape leads to the final prediction. For tracking, the prediction of the previous frame is used as the initial shape for the present frame.

Occlusion handling is one of the challenges to a robust tracking algorithm. Due to occlusion the shape predicted by the tracker deviates towards the boundary between tracked and occluding objects. This results in distortion of shape in an un-occluded part as well. If the occlusion persists for more than a few frames, it may result in the tracked shape to be completely deformed and finally lost. Hence, the process has to start again.

To handle the occlusion, some of the methods use exemplars to search for similar shapes or parts of similar shapes and use them for alignment, see NPL 1. In NPL 1, shape constraint is provided by the exemplars and alignment is done by solving a graph matching problem.

Other methods use robust estimators to truncate part responses that fall below a certain threshold, see NPL 2. In NPL 2, features of occlusion are considered to be outliers and a robust m-estimator is used to solve the alignment problem by weighting the outliers accordingly.

Another class of methods use occlusion annotations when training where each layer predicts both part locations and occlusion states, see NPL 3. The method disclosed by NPL 3 requires the knowledge of occluded feature points beforehand.

PTL 1 (Yang et al.) discloses object tracking with occlusion as a segmentation problem in the object space. Appearance models based on color distribution is used to interpret between foreground and background. The method disclosed by PTL 1 works well when object can be represented by a rigid model.

CITATION LIST

Patent Literature

[PTL 1]
United States Patent Application Publication No. 2009/0002489

Non Patent Literature

[NPL 1]
F. Zhou, J. Brandt, and Z. Lin, Exemplar-based graph matching for robust facial landmark localization, ICCV, 2013

[NPL 2]
J. M. Saragih, S. Lucey, and J. F. Cohn, Deformable model fitting by regularized landmark mean-shift, IJCV, 91(2): 200-215, 2011

[NPL 3]
X. P. Burgos-Artizzu, P. Perona, and P. Doll'ar, Robust face landmark estimation under occlusion, ICCV, 2013

SUMMARY

Technical Problem

In NPL 1, the shape constraint is provided by the exemplars and the alignment is done by solving a graph matching problem. In the method disclosed by NPL 1, it is assumed that changes in object shape can be captured through limited number of exemplars. This may not be the case always, because objects such as faces can have a lot of changes in shape, pose and in the parts of the shape such as mouth, nose, eyes etc. Moreover, any number of feature points can be occluded and an occlusion object can have any appearance or shape. Hence it is not feasible to represent changes in each of them.

In NPL 2, features of occlusion are considered to be outliers and a robust m-estimator is used to solve the alignment problem by weighting the outliers accordingly. However, in the formulation in the method disclosed by NPL 2, an outlier is a feature point which is inconsistent with the shape model; nonetheless it is also possible for the outlier to be consistent with the shape model but inconsistent with ground truth. This means that if there is a testing image which is different from the training image, the shape model will predict an estimate consistent with the model but inconsistent with the testing image. These cases also need to be addressed.

The method disclosed by NPL 3 requires the knowledge of occluded feature points beforehand. Hence a database with information regarding feature point location and occlusion information is needed.

The method disclosed by PTL 1 works well when an object can be represented by rigid model. For non-rigid objects such as faces, more robust algorithm is needed.

Despite the advances mentioned above, the occlusion remains to be a challenging problem.

During tracking of the object's feature points, there can be occlusion of some feature points. This leads to drifting of the occluded feature points away from an actual shape for example towards the occlusion edge. This also leads to the misalignment of the un-occluded feature points, as the inter-point relationship is implicitly encoded in the object shape. It is also impossible to learn the shape-feature relationship of every type of occluding objects. So the tracking algorithm must be robust enough to distinguish between the features of occluded and un-occluded feature points. Also it needs to restrict the motion of the already aligned feature points.

Although there are existing approaches which try to solve this problem, they also suffer from some drawbacks as follows. Objects such as faces can have a lot of changes in shape, pose and also in the parts of the shape such as mouth, nose, eyes etc. Hence it is not feasible to represent changes in each of them using exemplar based approaches. Moreover, some other approaches require a database with information regarding feature point location and occlusion information. Furthermore, for non-rigid objects such as faces, we need more robust algorithm than PTL 1. Also robust estimators do not deal with cases where an outlier is consistent with the shape model but inconsistent with ground truth.

The present invention has been conceived to solve the above mentioned problems. In addition to the entities mentioned above, other apparent and obvious drawbacks that this invention can overcome will be revealed from the detailed specification and drawings.

One of the objects of the present invention is to provide an image processing device that is able to track feature points of an object accurately even when occlusion of a part of the object occurs.

Solution to Problem

An image processing device according to one of the exemplary aspects of the present invention includes: feature extraction means for extracting features from an image based on a shape which includes sub parts each being one or more feature points each being correlated with a position of an object imaged in the image; alignment means for deriving an estimated shape by applying, to an initial shape, a model in models which include a global model representing a relation between the feature and the motion of the shape, and local models each representing a relation between the feature and the motion of a sub part in the sub parts; occlusion detection means for detecting, in the sub parts, an occluded sub part by comparing the estimated shape from a previous image and the estimated shape which is derived from the image by applying the global model; and estimation means for selecting, in the local models, local models each restricts the motion of the sub part that is detected as the occluded sub part, and combining estimated shape derived by applying the selected local models to generate a final output.

An image processing method according to one of the exemplary aspects of the present invention includes: extracting features from an image based on a shape which includes sub parts each being one or more feature points each being correlated with a position of an object imaged in the image; deriving an estimated shape by applying, to an initial shape, a model in models which include a global model representing a relation between the feature and the motion of the shape, and local models each representing a relation between the feature and the motion of a sub part in the sub parts; detecting, in the sub parts, an occluded sub part by comparing the estimated shape from a previous image and the estimated shape which is derived from the image by applying the global model; and selecting, in the local models, local models each restricts the motion of the sub part that is detected as the occluded sub part, and combining estimated shape derived by applying the selected local models to generate a final output.

A computer-readable medium according to one of the exemplary aspects of the present invention stores a program that causes a computer to operate as: feature extraction means for extracting features from an image based on a shape which includes sub parts each being one or more feature points each being correlated with a position of an object imaged in the image; alignment means for deriving an estimated shape by applying, to an initial shape, a model in models which include a global model representing a relation between the feature and the motion of the shape, and local models each representing a relation between the feature and the motion of a sub part in the sub parts; occlusion detection means for detecting, in the sub parts, an occluded sub part by comparing the estimated shape from a previous image and the estimated shape which is derived from the image by applying the global model; and estimation means for selecting, in the local models, local models each restricts the motion of the sub part that is detected as the occluded sub part, and combining estimated shape derived by applying the selected local models to generate a final output. The program stored in above-described computer readable storage medium also realizes one of the exemplary aspects of the present invention.

Advantageous Effects of Invention

According to the present invention, it is possible to track feature points of an object accurately even when occlusion of a part of the object occurs.

BRIEF DESCRIPTION OF DRAWINGS

FIG. 9 is a block diagram showing an example of the image processing device 100A according to a second exemplary embodiment of the present invention.

DESCRIPTION OF EMBODIMENTS

To solve the technical problems discussed above, the overall approach is summarized here. A number of models are learned, these models differ from each other based on a part of a shape to which restriction is applied, ranging from no restriction to high restriction. This means that for a particular model, some part or combination of parts will have their motion restricted. These parts will be selected by feature comparison from previous frames, and the ones with most deviation will be selected. Also the amount of restriction depends inversely on a feature comparison scores. This feature comparison score is higher for similar features. Using these models; object shapes are estimated. Furthermore, different parts from different models can be combined together to give the final estimated shape.

First Exemplary Embodiment

Hereinafter, a first exemplary embodiment of the present invention will be described in detail.

Figure 1:
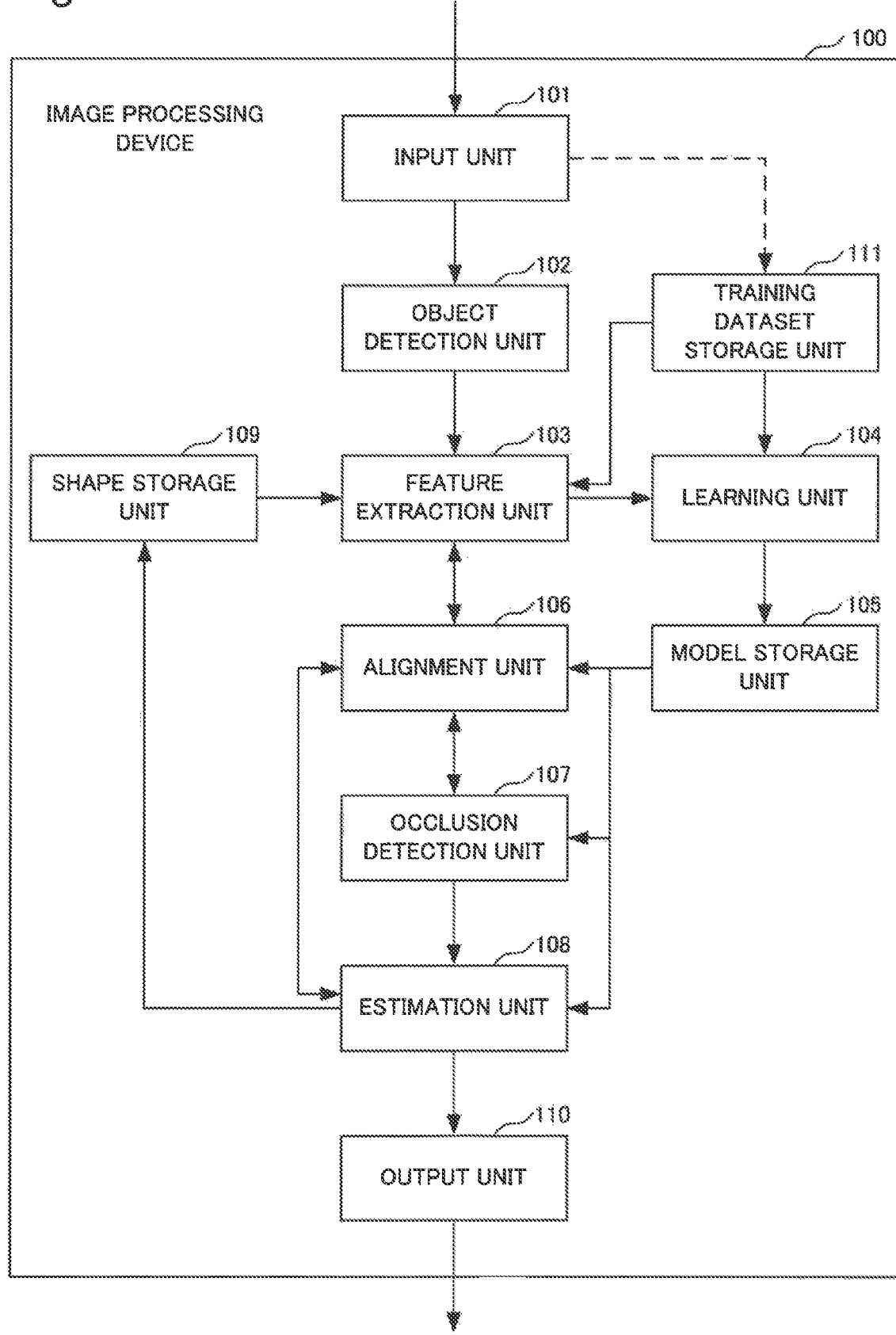
FIG. 1 is a block diagram showing an example of a structure of an image processing device 100 according to a first exemplary embodiment of the present invention.

FIG. 1 is a block diagram showing an example of a structure of an image processing device 100 according to the first exemplary embodiment of the present invention. With reference to FIG. 1, the image processing device 100 includes an input unit 101, an object detection unit 102, a feature extraction unit 103, a learning unit 104, a model storage unit 105, an alignment unit 106, an occlusion detection unit 107, an estimation unit 108, a shape storage unit 109, an output unit 110 and a training dataset storage unit 111.

The input unit 101 receives a series of frames i.e. images, for example, frames of a video, still images or the like, in tracking phase. The input unit 101 may receive a series of frames i.e. training frames and ground truth shape for each of the frames, for example, in learning phase or before the learning phase. The ground truth shape may be referred to as a "ground truth" in the following. The input unit 101 may store the training frames and the ground truth shapes in the training dataset storage unit 111. In the following description, the frames and a frame in the frames may be referred to as "images" and an "image" respectively. The training frames and a training frame in the training frames are referred to as "training images" and a "training image" respectively.

The object detection unit 102 detects a region of an object, such as a face or one of other objects which may include several parts, in the frames. In the following explanation, the object detection unit 102 detects a region of a face in the frame.

The feature extraction unit 103 extracts features from a frame in the frames based on a shape. The shape is represented by feature points. Each of the ground truth shape is a shape determined as a true shape of the object in each of the training frames. The shape includes sub parts each of which is one or more feature points. More specifically, the shapes and the sub parts are represented by coordinates of the feature points respectively. Each of the feature points is correlated in advance with a spot of the object imaged in the frames. The shapes including the ground truth shapes of the present exemplary embodiment are data values of position information of feature points in frames. And the feature points are correlated with the same spots of the object. Each of the shapes is represented by coordinates of the feature points. The coordinates are defined in a coordinate system set in advance in the frames.

The learning unit 104 learns models by one or more series of training frames with shapes i.e. ground truth shapes. More specifically, the learning unit 104 learns the models by features extracted from training frames on the ground truth shape and difference between ground truth shapes. The learning unit 104 stores the learned models in the model storage unit 105. The learning unit 104 may calculate the mean shape from the ground truth shapes stored in the training dataset storage unit 111 and set the mean shape. The mean-shape may be calculated in advance and may be stored in the training dataset storage unit 111.

Each of the models represents a relation between the feature and a motion of the shape. The motion of a shape is, for example, data values representing differences of a coordinates of each of the feature points included in the shape. Each of the models can be used so as to convert the features to the motion of the shape. Converting features to a motion of a shape by a model may be referred to as "applying" the model to the features. For example, when the features and the shape are represented by vectors, the model may be represented by a matrix. The models include a global model and local models. The global model represents the relation between the feature and the motion of the shape. Each of the local models represents the relation between the feature and the motion of one of the sub parts. Each of the local models restricts the motion of at least one of the sub parts. In other words, in the motion converted by a local model in the local models, a size of the motion of the sub part restricted by the local model is zero or almost zero.

The model storage unit 105 stores the models. The model storage unit 105 may store the mean shape as the initial shape.

The alignment unit 106 derives an estimated shape by applying a model in the models to the initial shape. The estimated shape is a shape derived by applying a model to features. The initial shape may be a predetermined shape i.e. the mean shape derived by the learning unit 104 or given in advance. The mean shape may be referred to as the "mean-shape" in the following. The initial shape may be an estimated shape derived from a previous frame of the frame (i.e. a current frame) when there is the estimated shape derived from the previous frame. The current frame may be referred to as a "current image" and the previous frame may be referred to as a "previous frame" in the exemplary embodiments of the present invention.

The occlusion detection unit 107 detects, in the sub parts, an occluded sub part by comparing the estimated shape from a previous frame of the frame and the estimated shape which is derived from the frame by applying the global model to the features extracted from the frame on the initial shape. The estimated shape from a previous frame is a final output frame which is derived from the previous frame of the frame, which will be described later.

The estimation unit 108 selects local models which restrict the motion of the sub part that is detected as a sub part which is occluded, and combining, as a final output shape i.e. a final estimated shape, estimated shape derived by applying the selected local models. In other words, the estimation unit 108 derives the final output shape by combining, as the final output shape, the estimated shapes derived by applying the selected local models. The estimation unit 108 stores the final output shape in the shape storage unit 109. As described above, each of the feature points included in each of the shapes is correlated with a predetermined position of the object imaged in the frames. Therefore, deriving the final output shape is equivalent to tracking the feature points of the object.

The shape storage unit 109 stores the final output shape in the shape storage unit 109.

The output unit 110 outputs the final output shape. The output unit 110 may plot predetermined marks on the frame at positions represented by the coordinates of the feature points included in the final output shape and output the frame with the plotted marks.

The training dataset storage unit 111 stores a training dataset which is the series of the training frames with ground truth shapes.

Next, an operation of the image processing device 100 according to the first exemplary embodiment will be explained in detail with reference to drawings.

Figure 2:
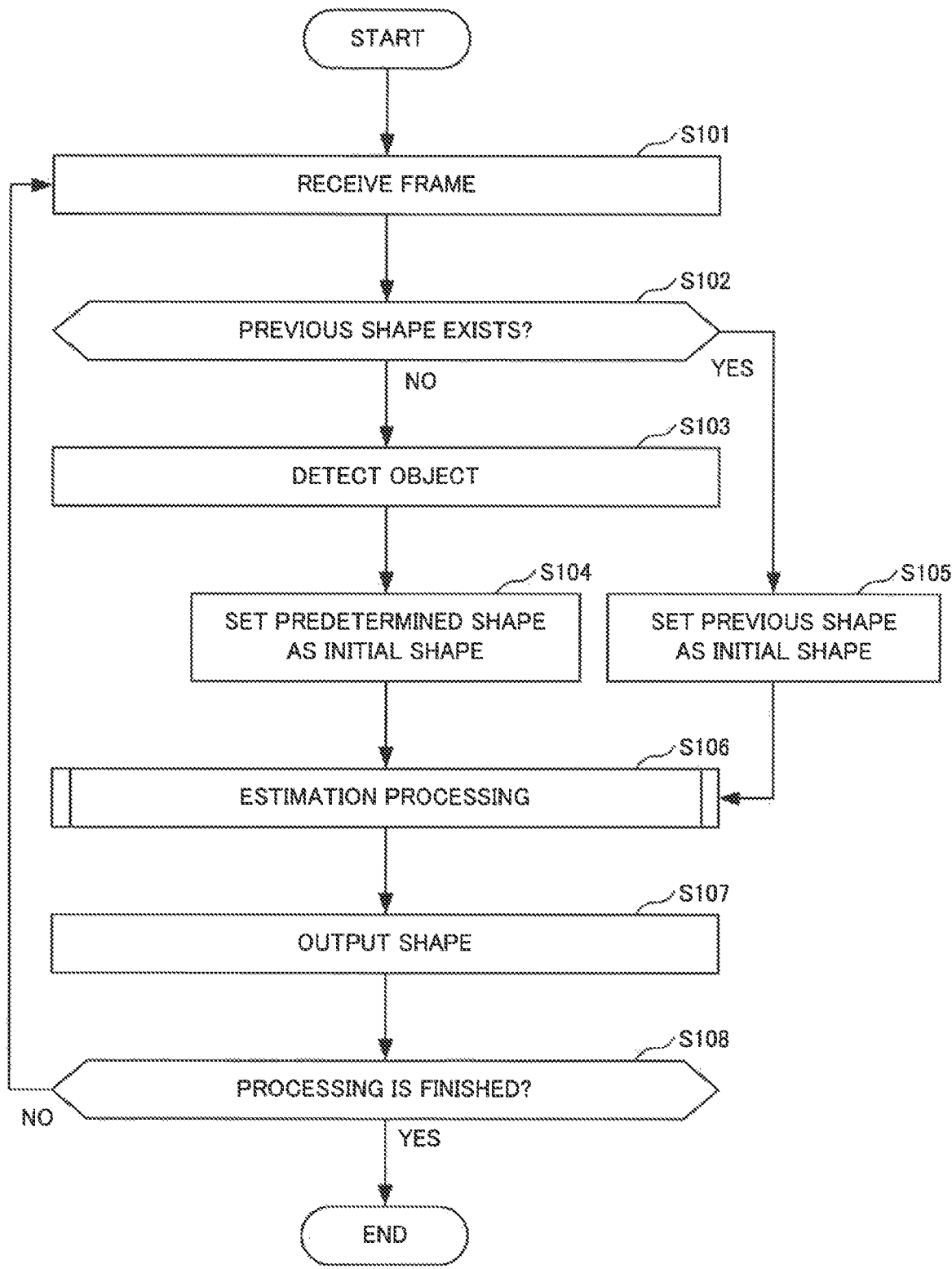
FIG. 2 is a flowchart illustrating an example of an operation of the image processing device 100 according to the first exemplary embodiment of the present invention in training phase.

FIG. 2 is a flowchart illustrating an example of the operation of the image processing device 100 according to the first exemplary embodiment of the present invention in tracking training phase.

The operation of the image processing device 100 according to the first exemplary embodiment of the present invention can be broadly divided into training and tracking phase. In this paragraph an overview of the present invention will be described with reference to FIG. 2 and the tracking phase will be explained. As described before, tracking of feature point begins by detection of object in the initial frame and tracking of the object in the subsequent frames. As can be seen in FIG. 1, a frame is input to the system (Step S101) and the object detection unit 102 performs a check to find out if the previous frames object (or object shape) i.e. a previous face exists (Step S102). The previous face is a shape that is estimated based on a previous frame of the received frame. If no previous face exists (NO in Step S102), the object detection unit 102 performs face detection (Step S103) which is detection of just a sub-region of the received frame containing the face. The object detection unit 102 may be a specific implementation of a general object detector. The first detected face region is now represented by an initial shape i.e. the mean shape given in advance (Step S104). The object detector may determine a size and a position of the mean shape based on the detected face region so that the mean shape is included in the detected face region. In this case, the first estimation unit 106 uses the mean shape as the initial shape. When a previous face exists (YES in Step S102), the previous face is used as the initial shape (Step S105). In this case, the alignment unit 106 uses the previous face as the initial shape. Shape here refers to the concatenation of feature point locations in one vector of all the feature points. Mean shape may be obtained by during training and will be explained later. The initial shape is used in estimation processing (Step S106).

The alignment processing will be explained in detail later. The following is the brief description of the alignment processing. The feature extraction unit 103 extracts features using the initial shape. The features of the present exemplary embodiment refer to operators which can help in shape or texture description.

Next, the alignment unit 106 performs alignment processing by using the global model learned during the training phase, driving motions including directions for all the feature points. Further explanation using mathematical equations of the training phase and alignment processing is provided later. Shape increments are the outputs of the model, given the extracted features as the inputs. This process can be run in a cascade, where output of each stage of the cascade serves as an input to the next stage of the cascade, the number of cascades depends on the alignment error between the estimated shape and the ground truth shape and learned during the training phase. During this procedure deviation in shape is also measured and is used for occlusion detection and restriction of motion of the feature points by the occlusion detection unit 107. The deviation is measured by feature comparison between current and previous frame's shape to generate a score, it is assumed that the first frame is free of occlusion. The specific details regarding occlusion detection and prevention will be explained later along with figures.

Next, using the deviation score information, the estimation unit 108 selects part based models by which the estimation unit 108 restricts motion of a particular part while aligning other parts. The part based models are referred to as the "local models" described above. The parts are predefined and learnt in the training phase. The final output is the combination of shape outputs from each of the part based models. The combination of the part based models is also a learning problem, where alignment accuracy of the model determines whether the feature point is chosen from that model or not. The estimation unit 108 combines the shape outputs of the part based models.

Next, the output unit 110 outputs estimated shape i.e. the final output described above (Step S107). When processing of the image processing device 100 is not finished (No in Step S108), the input unit 101 receives a next frame (Step S101). When processing of the image processing device 100 is finished by an instruction from a user of the image processing device 100 via a input device (not illustrated) (YES in Step S108), the image processing device 100 stops the processing shown in FIG. 2.

Next, an operation of the image processing device 100 according to the first exemplary embodiment in the training phase will be described in detail with reference to drawings.

Figure 3:
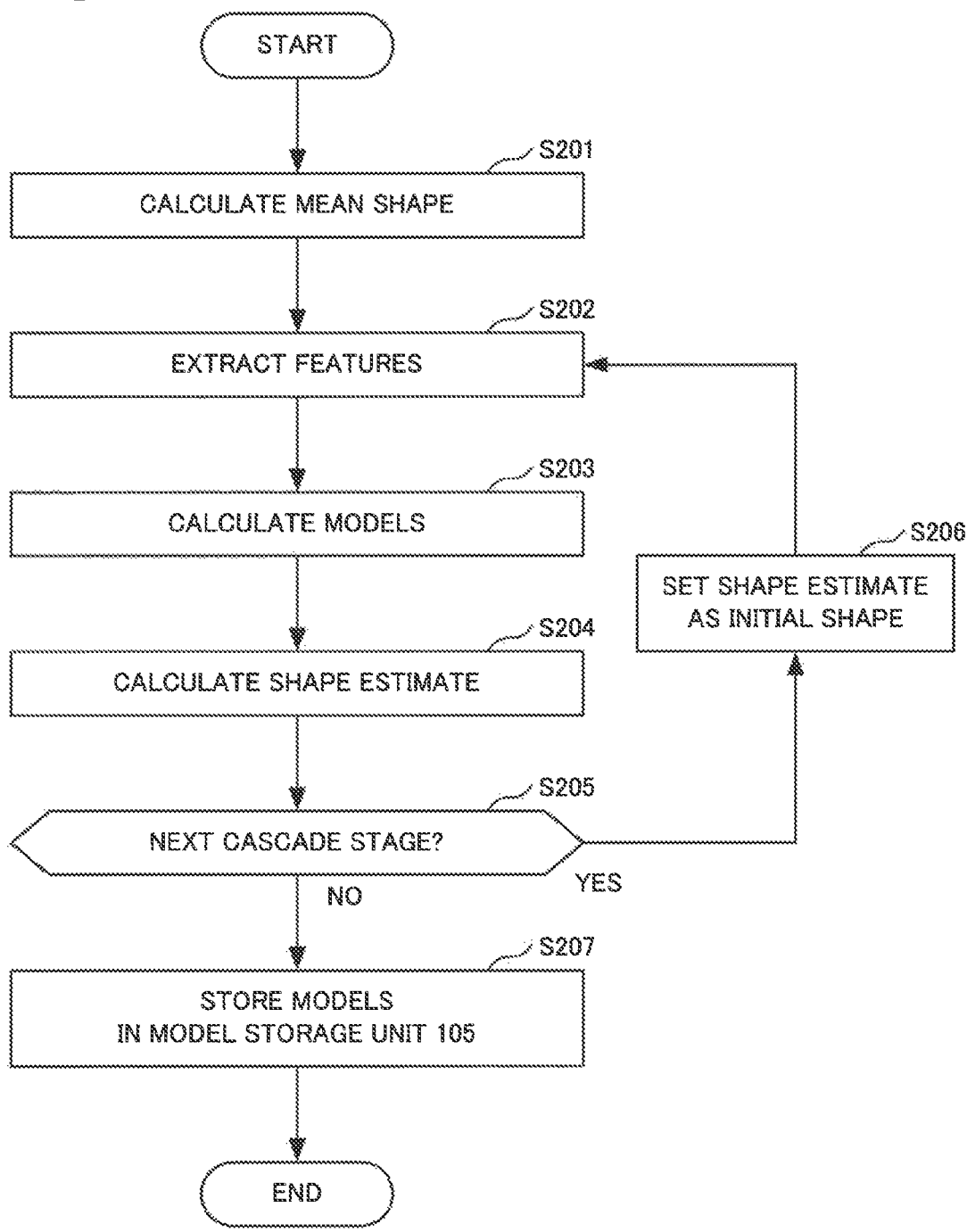
FIG. 3 is a flow chart showing an example of an operation of the image processing device 100 according to the first exemplary embodiment of the present invention in training phase.

FIG. 3 is a flow chart showing an example of an operation of the image processing device 100 according to the first exemplary embodiment in the training phase.

As described above, the models are needed to be learnt. So, before the tracking can be applied, a training phase is necessary, in which the models in the first exemplary embodiment will be learnt from a training dataset. The training dataset is stored in the training dataset storage unit 111. The training dataset includes a number of images (i.e. training frames) and their corresponding face shape information (i.e. coordinates of the feature points in the images) referred to as ground truths or ground truth shapes, which are shapes given as true shapes. The coordinates of the feature points may be represented by 'x' and 'y' axis values. First of all, from the training set we obtain the mean shape $S_0$. This can be obtained in the following way:

$$S_0 = \frac{1}{m}\sum_{i=1}^{m} S_i \qquad \text{[Math. 1]}$$

In the equation shown in Math. 1, $S_i$ is the shape vector of the i-th image and is given by $S_i=[x_1, y_1 \ldots x_n, y_n]$ where, $x_i, y_i$ are the 'x', 'y' axis values of the i-th feature point and n is the number of feature points while m is the total number of training images. The constant n is fixed. The 'x', 'y' axis values of feature points may be determined manually or by specific operators. Each of the n feature points is determined so that each of the n feature points indicates a fixed spot on the object. The fixed spot may be, for example, a left corner of a mouth, a tail of a right eye, or the like. However, rotation, scaling and translation differences between the shapes are needed to be removed. This can be done using many methods and the most common way is by Procrustes analysis. In general, for the similarity case it can be shown that to align two shape vectors z and z', centered on the origin, we need to scale and rotate z by c and d, so as to minimize |cAz−z'|, where a matrix A performs rotation of z by d, $$a=(z \cdot z')/|z|^2 \qquad \text{[Math. 2]}$$

$$b=(\Sigma_{j=1}^{n}(x_j y'_j - x'_j y_j))/|z|^2 \qquad \text{[Math. 3]}$$

Using a and b calculated by Math. 2 and Math. 3, c and d are calculated by equations $c^2=a^2+b^2$ and $d=\tan^{-1} b/a$. The shapes can centered at the origin by $S_i - S_i^G$ where;

$$S_i^G = \left( \left( \frac{1}{n} \sum_{j=1}^{n} x_j^i \right), \left( \frac{1}{n} \sum_{j=1}^{n} y_j^i \right) \right) \qquad \text{[Math. 4]}$$

In this equation, $x_j^i$ and $y_j^i$ are the 'x' and 'y' axis values of the j-th feature point of the i-th image and the mean shape $S_i^G$ is the center of gravity of the shape. Now the mean-shape can be used as the initial shape to train the models.

As described above, the learning unit 104 may calculate the mean shape from the ground truth shapes stored in the training dataset storage unit 111 (Step S201) and set the mean shape as the initial shape. The mean-shape may be calculated in advance and may be stored in the training dataset storage unit 111.

The models include the models referred to as the global models and the models referred to as the local models or the part based models in the exemplary embodiments of the present invention. The difference between the global models and the part based models is that global models align all of the feature points while the part based models only align sub-parts of the object shape. The sub parts are pre-defined as some logical group of feature points forming a sub region of the entire shape. When the object is a face, the sub parts may be, for example, feature points belonging to a left eye, feature points belonging to a right eye, feature points belonging to a nose, feature points belonging to a mouth, feature points belonging to a jaw, and the like. With reference to FIG. 3, the feature extraction unit 103 extracts features concerning to the initial shape (Step S202). Using the ground truth shape and the mean-shape as the initial shape, a relation is found between the extracted features. Extracted features refer to features such as HOG (Histogram of Oriented Gradients), LBP (Local Binary Patterns), normalized gradients etc. These features can be either global i.e. extracted around the whole shape or local i.e. extracted around patches centered at each of the feature points. Using regression the learning unit 104 calculates the models i.e. data values representing a relation between the extracted features and the shape difference of initial and ground truth shape (Step S203). This relation is defined using a linear model. This is also referred to as the alignment procedure.

The learning unit 104 calculates an estimated shape that is a shape which is estimated by applying the model to the initial shape and calculates the incremental shape (Step S204).

Since the alignment procedure involves the alignment of a large number of feature points (n), the alignment procedure is very complex and thus more than one stage is needed for accurate alignment. Hence a cascaded approach is used where the output of each cascade stage serves as an input to the next stage of the cascade. The number of cascades depends on the alignment error between the estimated shape and the ground truth shape and may be learned during the training phase. Each cascade outputs an incremental shape. The learning unit 104 may determine whether the image processing device 100 transfers to a next cascade stage on the basis of the alignment error between the estimated shape and the ground truth shape (Step S205). When the image processing device 100 transfers to the next cascade stage (YES in Step S205), the learning unit 104 set the estimated shape as the initial shape (Step S206). When the image processing device 100 does not transfer to a next cascade stage (NO in Step S205), the learning unit 104 stores the models in the model storage unit 105. The final shape is the combination of the initial shape and the incremental shape in each of the cascades (S207).

The training of the models to learn the relation between extracted features and the shape difference can be seen as the following minimization problem, $$\|S_{GT} - S\|_2 \qquad \text{[Math. 5]}$$

Where, $S_{GT}$ is the ground truth shape and S is the estimated shape. To solve the minimization problem, the learning unit 104 may apply a least squares regression method so as to learn a relationship, i.e. direction of motion, between extracted features and the object shape. In this setting, shape alignment can be thought of as the following;

$$\min_{h_t} \Sigma_i \Sigma_{x_0^i} \|dx^{*i} - (h_t(I^i, P_0^i))\|_2 \qquad \text{[Math. 6]}$$

Where $dx^{*i} = (x^{*i} - x_0^i)$ is the shape increment and $P_0^i = f(I^i, x_0^i)$ is the feature vector, obtained by concatenating all the extracted features, I is the image and i is the image index. Where, $h_t$ is the model parameterized by t, which are the direction of motions, $x_0^i$ and $x^{*i}$ are the i-th initial shape and ground truth shape (given with the image and present in the dataset) respectively.

Figure 4A:
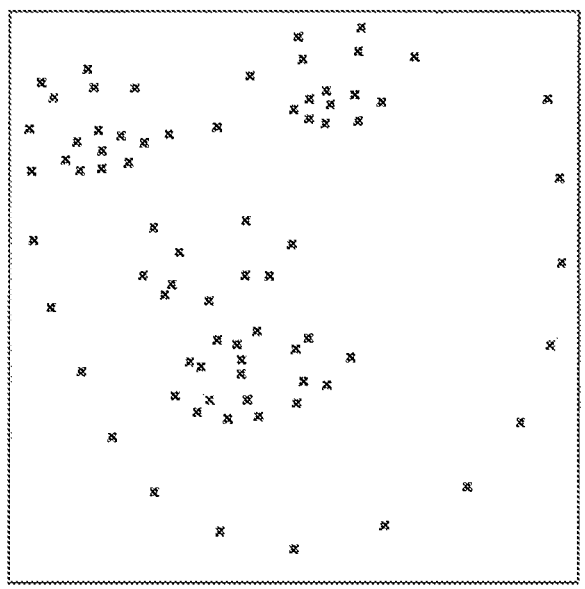
FIG. 4A is a figure depicting an example of the ground truth shape of a training image.
Figure 4B:
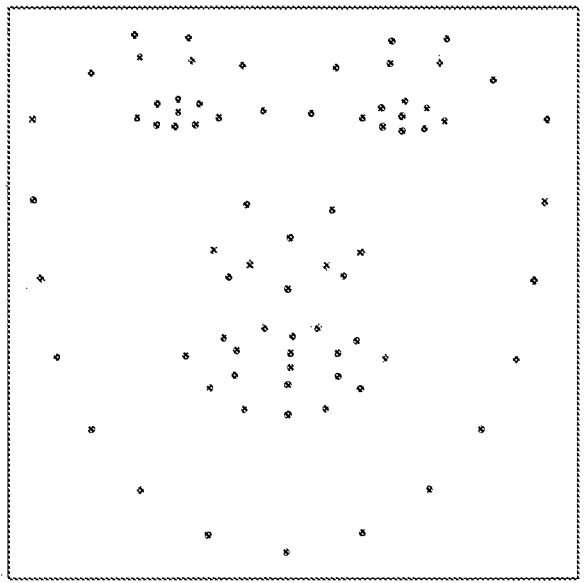
FIG. 4B is a figure showing an example of the initial shape (the mean shape), which is common to all the training and testing images.
Figure 4C:
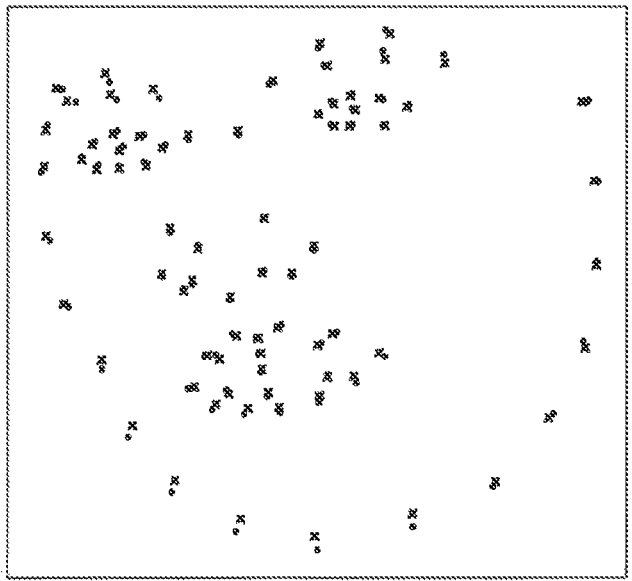
FIG. 4C is a figure depicting an example of a resulting shape.

FIG. 4A, FIG. 4B and FIG. 4C are figures illustrating what the ground truth, mean shape and their alignment look like. FIG. 4A is a figure depicting an example of the ground truth shape of a training image. FIG. 4B is a figure showing an example of the initial shape (the mean shape), which is common to all the training and testing images. FIG. 4C is a figure depicting an example of a resulting shape i.e. an estimated shape predicted by the models which are learned by the learning unit 104 and overlapped with the ground truth shape, wherein the initial shape after several cascades is now aligned with the ground truth shape. Occlusion is not shown in the example of FIG. 4A, FIG. 4B and FIG. 4C, as FIG. 4A, FIG. 4B and FIG. 4C are to visualize the working of the alignment procedure in general.

When occlusion occurs, the occluded feature points distort by also affecting the un-occluded feature points. Even though the resulting shape is consistent with the shape model, the resulting shape does not represent the true feature point positions of the current frame. In this exemplary embodiment, this observation is acknowledged and used for solving the partial occlusion problem. In this regard, a number of models are trained, i.e. $h_t$, using the minimization procedure explained above, each with motion restrictions applied to different sub parts of the object shape such as mouth, eyes, jaw etc. The number and types of sub-parts are decided experimentally. The motion restriction is also learned by the learning unit 104 during the training phase (in Step S204) using an equation of Math. 7. The learning unit 104 compares the feature points within the sub-parts. The learning unit 104 can compare the feature points based on Histogram intersection kernels, Mean Absolute Distance, Sum of Square Distance etc. The learning unit 104 uses the score of the comparison for learning the motion restriction weights during the training phase. This results in the following formulations;

$$\min_w \Sigma_i \Sigma_{q^i} \|S_{q^i} - w \cdot P(q^i, I^i)\|_2^2 \qquad \text{[Math. 7]}$$

In Math. 7, $S_d$ is the deviation score between the feature points and w represents the motion restriction weights. In Math. 7, P represents the extracted features. These features can be the same as used in the alignment step mentioned before, or they can be new ones. Also, $q^j$ represents the presence of the j-th feature point and $q^j$ can take the values $\{0, 1\}$ i.e. whether the feature point is present in the region or not. The term $P(q^j, I^i)$ represents the extracted features of the image (I) in which the j-th feature point presents. While tracking, among these different models, appropriate models are selected and then applied by the estimation unit 108. The selection and combination of these models will be explained later.

The final shape is produced by combining the various models used. With respect to this for example, one model corresponds to aligned feature points locations for the jaw, while another model results in a good alignment for other feature points excluding the jaw. Therefore, it is important to learn a function to select the best combination from the multiple models. Hence the estimation unit 108 solves the following optimization problem by;

$$\max_{\delta^i} \Sigma_i \Sigma_j h_r(I^i(x^i, \delta^i)), \text{ where } \delta^i = \{\delta_k^j\}, k=1, \ldots, V \text{ s.t. } \Sigma_{k=1}^V \delta_k^j = 1, \delta_k^j \in \{0,1\}. \quad [\text{Math. 8}]$$

When the equation represented by Math. 9 holds true, the equation represented by Math. 9 specifies that the J-th feature point is chosen from the K-th model (let the total models be V).

$$\delta_K^J = 1 \quad [\text{Math. 9}]$$

Also, the equation represented by Math. 10 specifies the constraint condition that j-th feature point is selected by the learning unit 104 only once from among the multiple models.

$$\Sigma_{k=1}^V \delta_k^j = 1 \quad [\text{Math. 10}]$$

Here, $x^i$ is the shape of the i-th image (I). The function $h_r$ is assumed to be a linear function given by;

$$h_r = r^T \cdot P(I^i(x^i, \delta^i)) \quad [\text{Math. 11}]$$

Where, $r^T$ is the parameter of the function $h_r$ and can be learned during the training phase, and the term concerning P represents the features extracted i-th image (I) under a solution of the problem represented by Math. 8. The above problem can be framed as follows;

$$r = \min_r \left( \sum \|S_{GT} - S\|_2^2 + \frac{L}{2} \|r\|_2^2 \right) \quad [\text{Math. 12}]$$

In Math. 12, the first term is used to measure the loss between the estimated shape S and ground truth shape $S_{GT}$, and the latter is used to regularize $r^T$ with L being the regularization parameter. The parameter L can be found out by cross-validation on a hold out set from among the training images.

Figure 5:
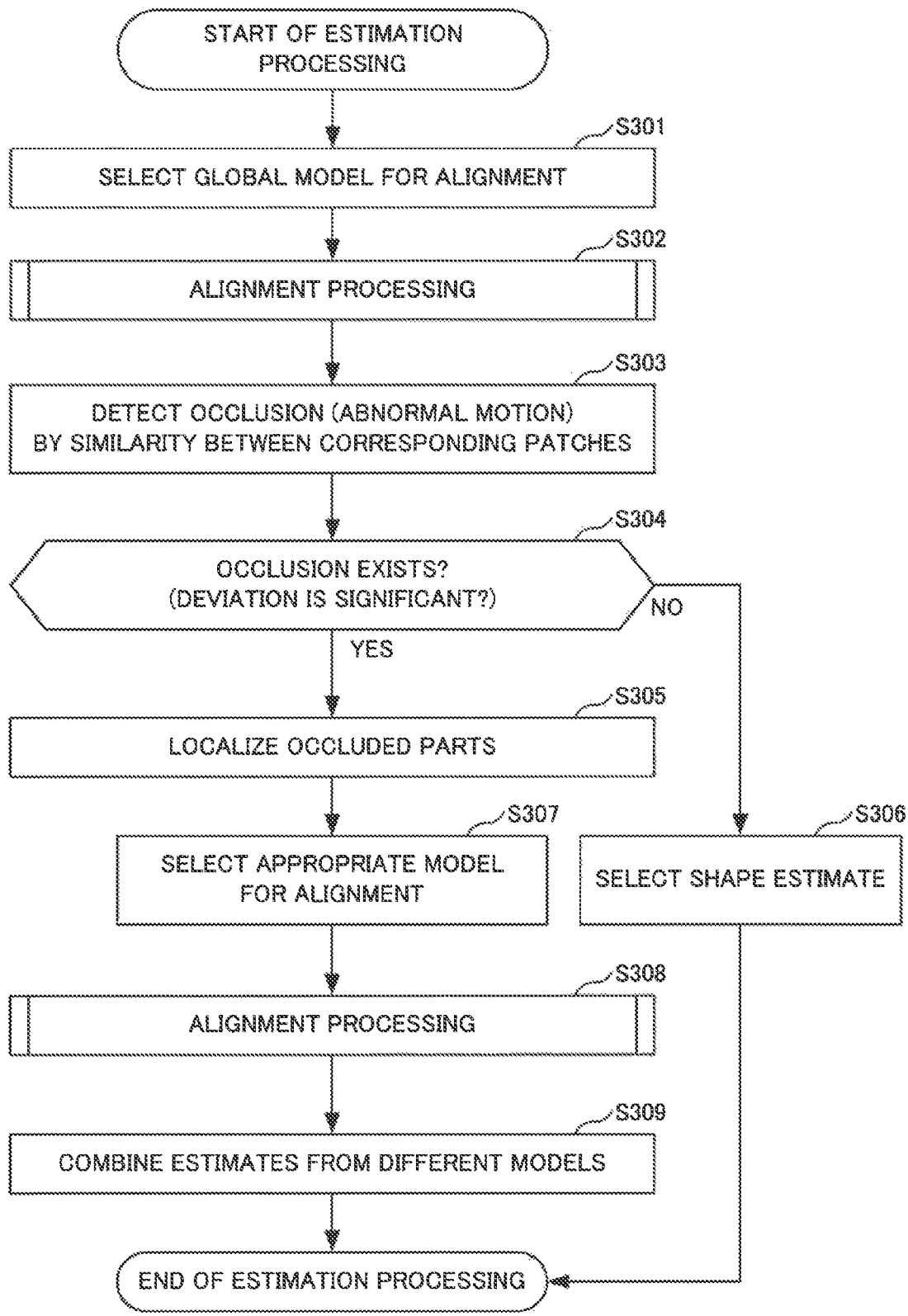
FIG. 5 is a flow chart showing the estimation processing of the image processing device 100 according the first exemplary embodiment of the present invention.

Next, the estimation processing (Step S106) of the tracking phase will be explained in detail with reference to FIG. 5. FIG. 5 is a flow chart showing the estimation processing of the image processing device 100 according the first exemplary embodiment of the present invention. The estimation processing shown in FIG. 5 includes abnormal motion detection and motion restriction along with model combining. With reference to FIG. 5, the feature extraction unit 103 selects the global model i.e. the model of no occlusion for alignment (Step S301). Next, an alignment processing (Step S302) is performed by the image processing device 100. The alignment processing will be described in detail later. By the alignment processing, the image processing device 100 derives the feature estimate i.e. a predicted shape from the current frame.

The occlusion detection unit 107 detects occlusion by detecting abnormal motion of feature points (Step S303). The occlusion detection unit 107 detects the abnormal motion by detecting similarity (i.e. calculating similarity scores having, for example, positive correlation with a degree of the similarity) between the corresponding patches centered on the feature points of the current and previous frames. The occlusion detection unit 107 determines whether occlusion exists by determining deviation according to the detected similarity is significant (Step S304). A determination in Step S304 is made on whether there is abnormal motion of the feature points by use of a threshold on the similarity score. The threshold is found out experimentally. If the similarity score is below the threshold then there is occlusion (YES in Step S304), when the larger the abnormal motion is, then the smaller the similarity score is. The occlusion detection unit 107 localizes occluded parts of the predicted shape of the current frame by considering the similarity score of feature points present in various sub parts (Step S305). The occlusion detection unit 107 may determine a sub part of the predicted shape of the current frame to be occluded when the sub part includes a feature point whose similarity score is below the threshold. The occlusion detection unit 107 may determine a sub part of the predicted shape of the current frame to be occluded when the sub part includes feature points whose similarity scores are below the threshold in a proportion over a proportion threshold.

The estimation unit 108 uses the occluded parts that is localized by the occlusion detection unit 107 to select the appropriate models, since the models represent the various sub parts, which are used to predict the corrected shape. The estimation unit 108 may select the appropriate models by solving the above-described optimization problem formulated by the equation shown in Math. 8. If however there is no occlusion (NO in Step S304) then the predicted shape is used as the final shape i.e. the final output shape (Step S306) without correction. The alignment unit 106 performs the alignment processing for each of the selected models (Step S308). In Step S308, the alignment unit 106 derives estimated shapes from the selected models each being different. Next the estimation unit 108 combines the estimated shapes from different models, which are derived in Step S308, to generate as the final shape. The estimation unit 108 uses the learnt weights for combining models to obtain the final output shape by selecting the feature points from models which have high alignment accuracy. The estimation unit 108 stores the final output shape in the shape storage unit 109.

Next, the alignment processing of the image processing device 100 will be described with reference to drawings.

Figure 6:
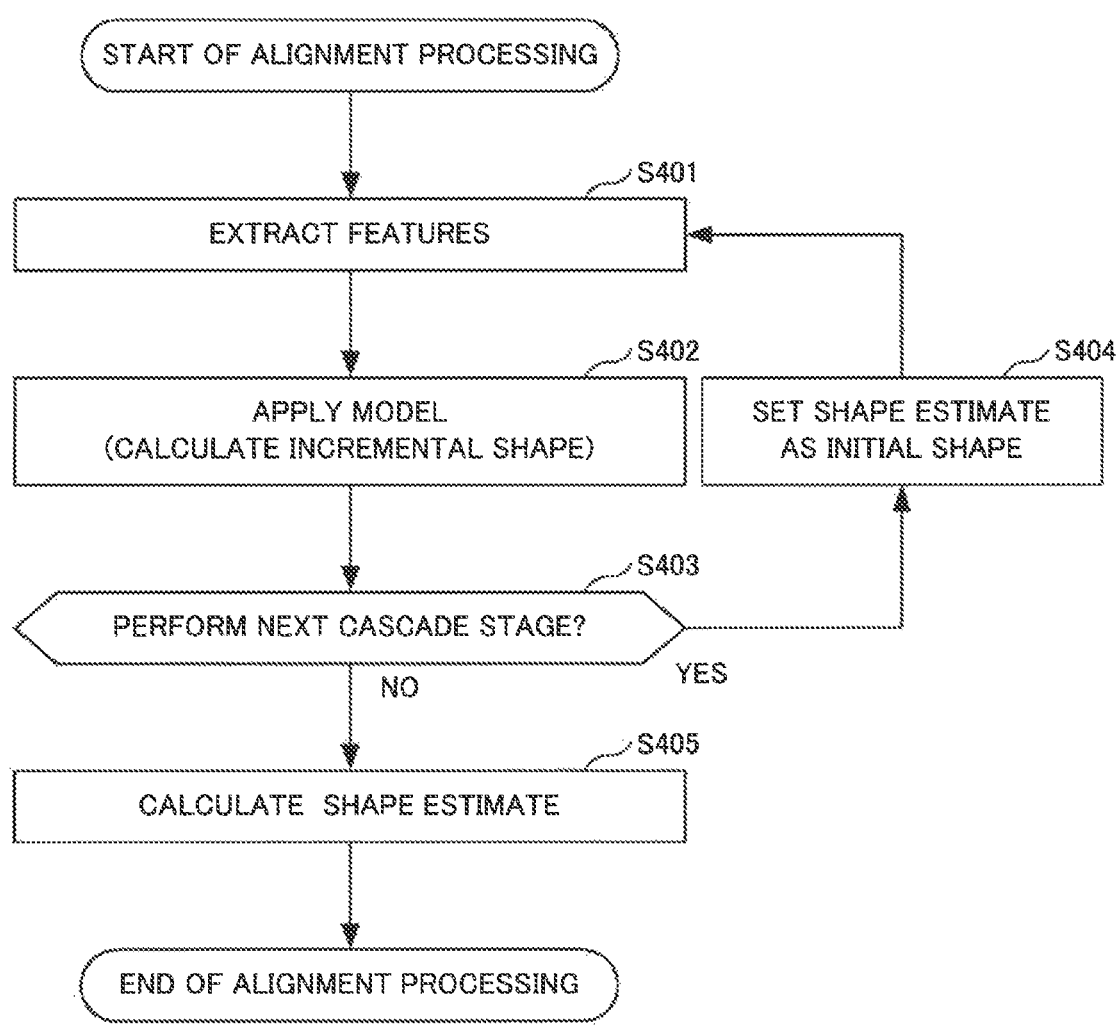
FIG. 6 is a flowchart showing the alignment processing of the image processing device 100 according to the first exemplary embodiment of the present invention.

FIG. 6 is a flowchart showing the alignment processing of the image processing device 100 according to the first exemplary embodiment of the present invention. The cascaded approach is also used where the output of each cascade stage serves as an input to the next stage of the cascade.

With reference to FIG. 6, the feature extraction unit 103 extracts features based on the initial shape (Step S401). The alignment unit 106 applies the model to the initial shape i.e. calculates incremental shape by using the model and the initial shape (Step S402). When the number of cascades is below a preset number (YES in Step S403), the feature extraction unit 103 and the alignment unit 106 perform a next cascade stage. In this case, the alignment unit 106 set the estimated shape as the next initial shape (Step S404). In Step S404, the estimated shape may be represented by the initial shape that is set before the alignment processing and incremental shapes. And Step S401 and Step S402 are repeated, and when the number of cascades reaches the preset number (NO in Step S403), the feature extraction unit 103 and the alignment unit 106 do not perform a next cascade stage. In this case, the alignment unit 106 may calculate the estimated shape by using the initial shape that is set before the alignment processing and incremental shapes (Step S405). The output of the alignment processing is the estimated shape. The estimated shape of output may be the initial shape that is set before the alignment processing and incremental shapes.

Figure 7A:
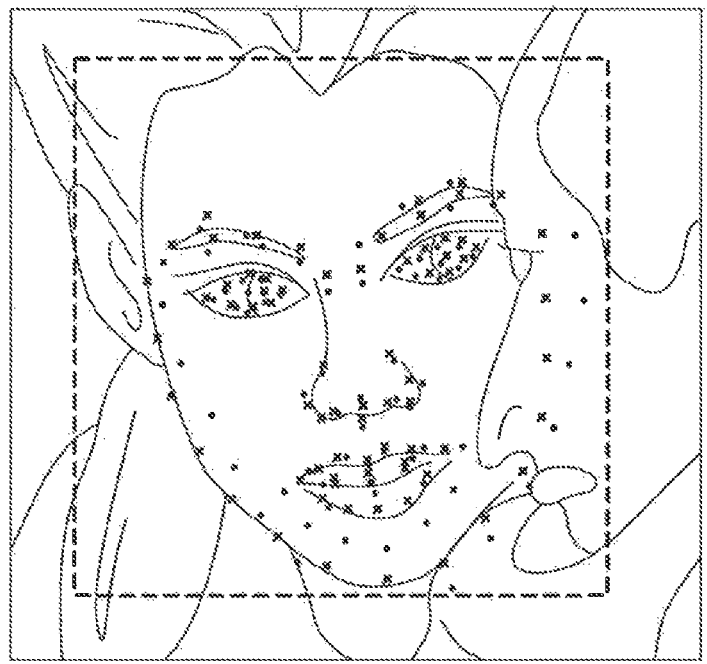
FIG. 7A is a figure showing an example of an experimental result of alignment approach without handling partial occlusion.
Figure 7B:
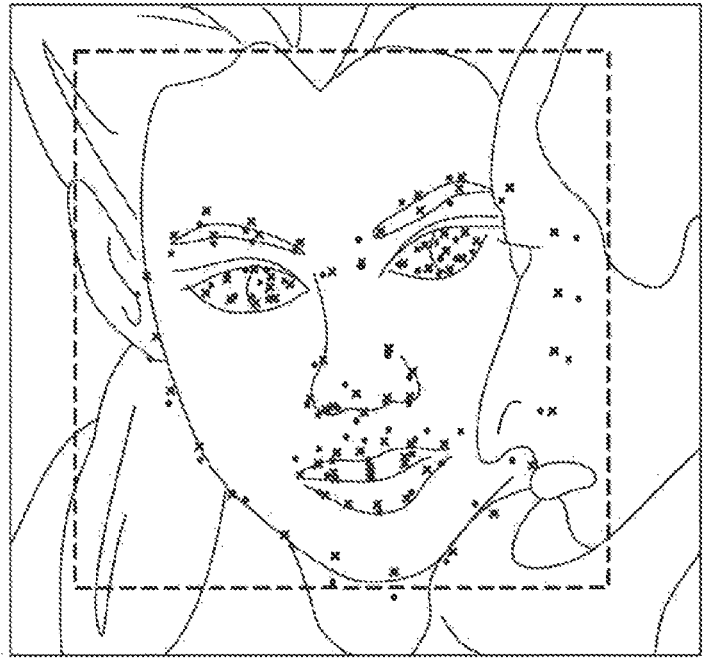
FIG. 7B is a figure showing an example of an experimental result according to the first exemplary embodiment.
Figure 8A:
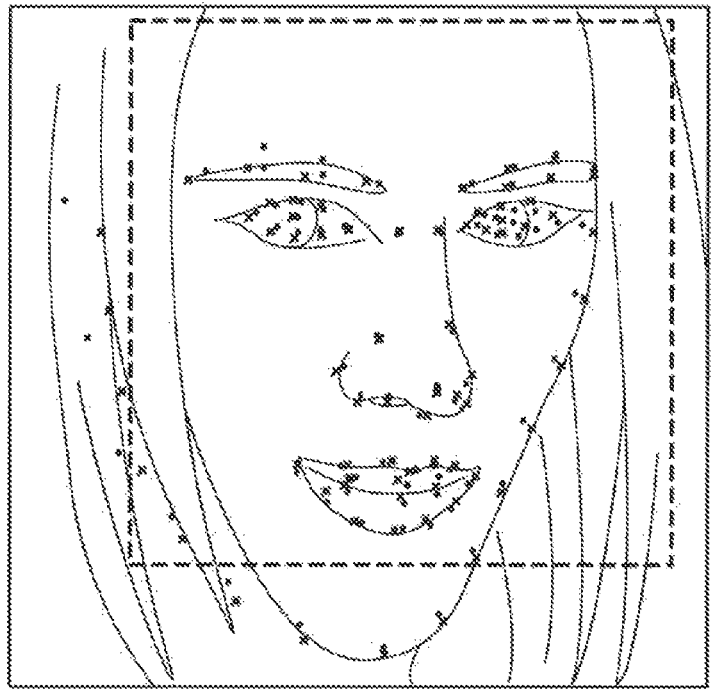
FIG. 8A is a figure showing an example of an experimental result of alignment approach without handling partial occlusion.
Figure 8B:
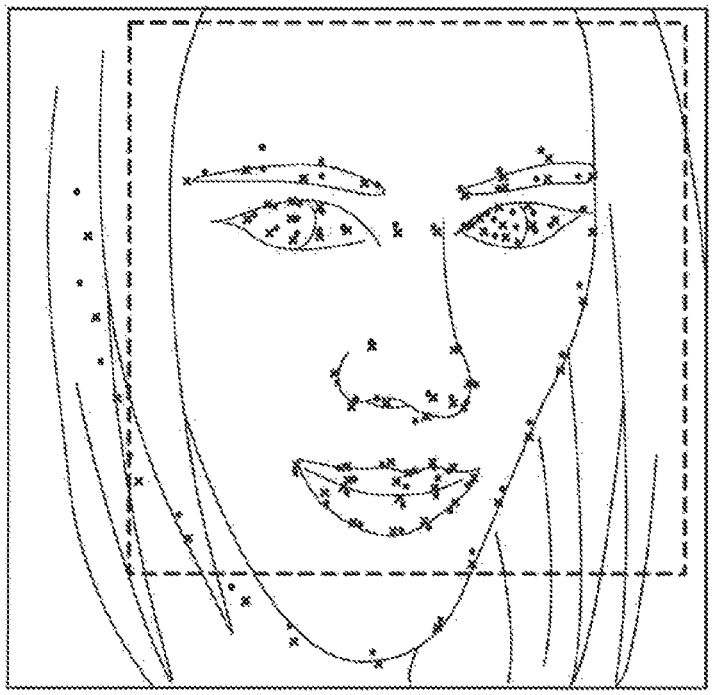
FIG. 8B is a figure showing an example of an experimental result according to the first exemplary embodiment.

Some of the experimental results can be seen in figures shown in FIG. 7A, FIG. 7B, FIG. 8A and FIG. 8B. FIG. 7A and FIG. 7B show representative examples of occlusion due to other objects, such as another person's face. FIG. 8A and FIG. 8B show representative examples of occlusion due to a part of the object itself, such as hair. Each of FIG. 7A and FIG. 8A depicts the result of standard alignment approach without handling partial occlusion. Each of FIG. 7B and FIG. 8B shows the result after handing occlusion. X-marks depict the ground truth shape and dots are the estimated shape. Boxes drawn by a broken line are bounding boxes obtained as a result of the face detection. Main outlines of the objects (i.e. faces) and other objects are also drawn in FIG. 7A, FIG. 7B, FIG. 8A and FIG. 8B for reference. When FIG. 7A and FIG. 8A are compared with FIG. 7B and FIG. 8B, it can be seen that occlusion disturbs all the feature points and not just the ones which are actually occluded.

The first advantageous effect of the present exemplary embodiment is that it is possible to track feature points of object accurately even under occlusion.

According to the present exemplary embodiment, the estimation unit 108 selects, in the local models, the local models each of which restricts the motion of the sub part that is detected as an occluded sub part by the occlusion detection unit 107. And the estimation unit 108 combines, to generate the final output shape, estimated shape derived by applying the selected local models by the alignment unit 106. As described above, deriving the final output shape is equivalent to tracking the feature points of the object in the present exemplary embodiment.

Other advantageous effects of the present exemplary embodiment will be explained in the following. The advantage of the present exemplary embodiment is that, the distortion caused by occlusion to the un-occluded part is rectified by limiting the motion of the parts. Also best parts are chosen from all the models to represent the final shape. Secondly, special databases with occlusion information are not required to the image processing device 100 according to the present invention, usual databases with location information of feature points are sufficient. Moreover, rigid and non-rigid shapes can be easily tracked. Furthermore, exemplars for changes in shape, pose and parts is not needed. Also since shape alignment is posed as a shape regression problem, methods such as robust estimators to solve the regression problem can be applied easily.

Second Exemplary Embodiment

Next, a second exemplary embodiment of the present invention will be described in detail with reference to drawings.

FIG. 9 is a block diagram showing an example of the image processing device 100A according to the second exemplary embodiment of the present invention. With reference to FIG. 9, the image processing device 100A includes: a feature extraction unit 103 which extracts features from an image based on a shape which includes sub parts each being one or more feature points each being correlated with a position of an object imaged in the image; an alignment unit 106 which derives an estimated shape by applying, to an initial shape, a model in models which include a global model representing a relation between the feature and the motion of the shape, and local models each representing a relation between the feature and the motion of a sub part in the sub parts; an occlusion detection unit 107 which detects, in the sub parts, an occluded sub part by comparing the estimated shape from a previous image and the estimated shape which is derived from the image by applying the global model; and an estimation unit 108 which selects, in the local models, local models each restricts the motion of the sub part that is detected as the occluded sub part, and combines estimated shape derived by applying the selected local models to generate a final output.

The second exemplary embodiment has the same advantageous effect as the first advantageous effect of the first exemplary embodiment. The reason which causes the advantageous effect is the same as that of the first advantageous effect of the first exemplary embodiment.

Other Exemplary Embodiment

Each of the image processing device 100 and the image processing device 100A can be implemented using a computer and a program controlling the computer, dedicated hardware, or a set of a computer and a program controlling the computer and a dedicated hardware.

Figure 10:
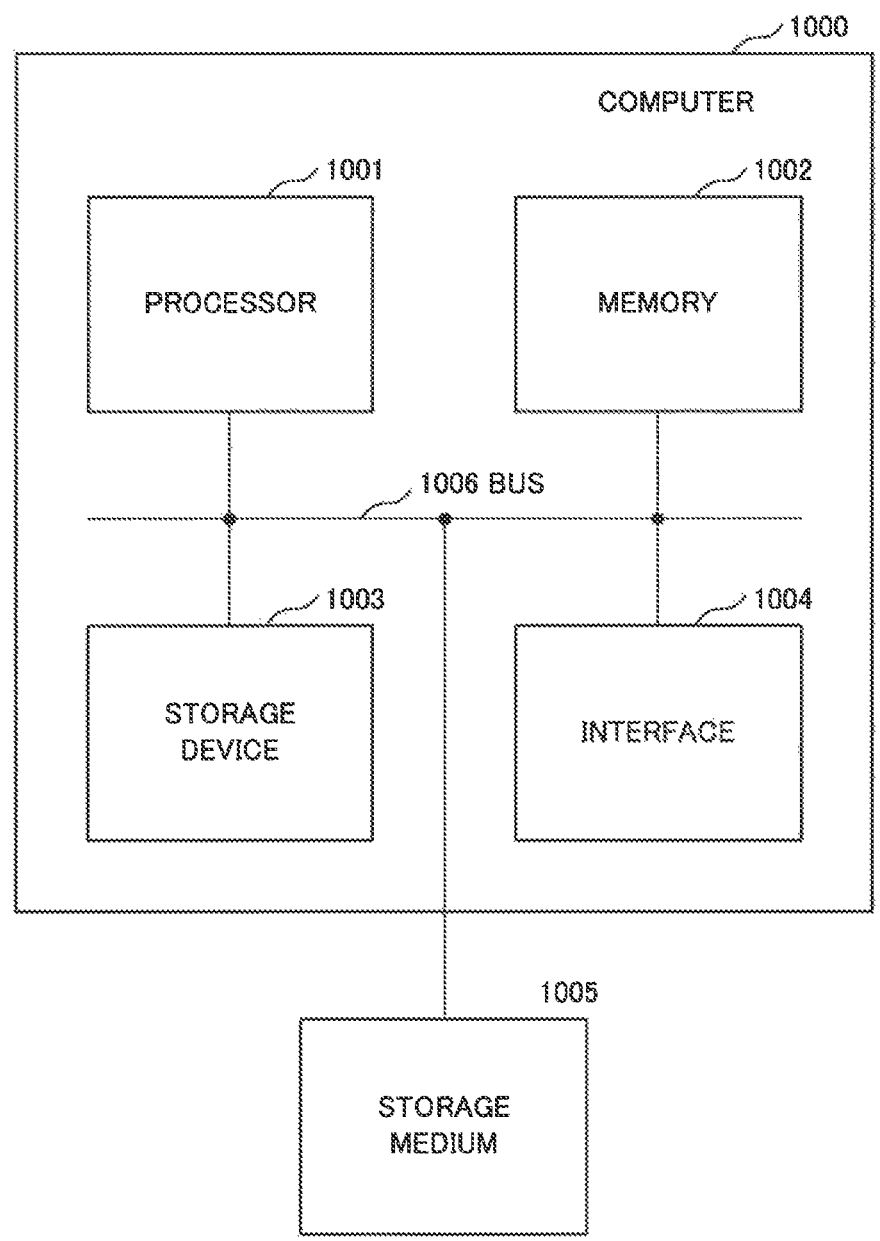
FIG. 10 is a block diagram showing an example of a hardware structure of a computer 1000 which is able to realize the image processing device according to the exemplary embodiments of the present invention.

FIG. 10 is a block diagram showing an example of a hardware structure of a computer 1000 which is able to realize the image processing device 100 and the image processing device 100A, which are described above. With reference to FIG. 10, the computer 1000 includes a processor 1001, a memory 1002, a storage device 1003 and an interface 1004, which are communicably connected via a bus 1006. The computer 1000 can access a storage medium 1005. Each of the memory 1002 and the storage device 1003 may be a storage device, such as a RAM (Random Access Memory), a hard disk drive or the like. The storage medium 1005 may be a RAM, a storage device such as a hard disk drive or the like, a ROM (Read Only Memory), or a portable storage medium. The storage device 1003 may operate as the storage medium 1005. The processor 1000 can read data and a program from the memory 1002 and the storage device 1003, and can write data and a program in the memory 1002 and the storage device 1003. The processor 1001 can communicate with a server (not illustrated) which provides frames for the processor 1001, a terminal (not illustrated) to output the final output shape, and the like over the interface 1004. The processor 1001 can access the storage medium 1005. The storage medium 1005 stores a program that causes the computer 1000 to operate as the image processing device 100 or the image processing device 100A.

The processor 1001 loads the program, which causes the computer 1000 operates as the image processing device 100 or the image processing device 100A, stored in the storage medium 1005 into the memory 1002. The computer 1000 operates as the image processing device 100 or the image processing device 100A by executing the program loaded in the memory 1002.

The input unit 101, the object detection unit 102, the feature extraction unit 103, the learning unit 104, the alignment unit 106, the occlusion detection unit 107, the estimation unit 108 and the output unit 110 can be realized by a dedicated program that is loaded in the memory 1002 from the storage medium 1005 and can realize each of the above-described units, and the processor 1001 which executes the dedicated program. The model storage unit 105, the shape storage unit 109 and the training dataset storage unit 111 can be realized by the memory 1002 and/or the storage device such as a hard disk device or the like. A part of or all of the input unit 101, the object detection unit 102, the feature extraction unit 103, the learning unit 104, the model storage unit 105, the alignment unit 106, the occlusion detection unit 107, the estimation unit 108, the shape storage unit 109, the output unit 110 and the training dataset storage unit 111 can be realized by a dedicated circuit that realizes the functions of the above-described units.

As a final point, it should be clear that the process, techniques and methodology described and illustrated here are not limited or related to a particular apparatus. It can be implemented using a combination of components. Also various types of general purpose device may be used in accordance with the instructions herein. The present invention has also been described using a particular set of examples. However, these are merely illustrative and not restrictive. For example the described software may be implemented in a wide variety of languages such as C++, Java, Python and Perl etc. Moreover other implementations of the inventive technology will be apparent to those skilled in the art.

While the present invention has been particularly shown and described with reference to exemplary embodiments thereof, the present invention is not limited to these embodiments. It will be understood by those of ordinary skill in the art that various changes in form and details may be made therein without departing from the spirit and scope of the present invention as defined by the claims.

REFERENCE SIGNS LIST 100 image processing device
100A image processing device
101 input unit
102 object detection unit
103 feature extraction unit
104 learning unit
105 model storage unit
106 alignment unit
107 occlusion detection unit
108 estimation unit
109 shape storage unit
110 output unit
111 training dataset storage unit
1000 computer
1001 processor
1002 memory
1003 storage device
1004 interface
1005 storage medium
1006 bus

The invention claimed is:

1. An image processing device comprising:
a memory that stores a set of instructions; and
at least one processor configured to execute the set of instructions to:
extract features of an object from a target image comprising the object based on a shape representing the object, the shape including sub parts, each sub part being a group of feature points, each feature point being correlated with a position within the object;
derive an estimated shape for the object by applying a global model to an initial shape within the target image, the global model representing a relation between one of the features extracted and a motion of the initial shape within the target image;
detect, in the sub parts, an occluded sub part by comparing the estimated shape for the object to an estimated shape for the object derived from an image previous to the target image;
select a local model to be applied to the occluded sub part that restricts the motion of the occluded sub part, wherein the local model represents a relation between the features and a motion of the occluded sub part of the sub parts and restricts a motion of at least one of the sub parts; and
generate a final output shape by combining an estimated shape that is derived by applying the selected local model to the occluded sub part and the estimated shape derived for the object by applying the global model.

2. The image processing device according to claim 1, wherein
the at least one processor is configured to:
set the initial shape as a first start shape, and derive the estimated shape by repetition of calculating a motion of a start shape by applying the global model to the features extracted from the image based on the start shape, and setting, as a next start shape, an incremental shape where the motion calculated is added to the start shape.

3. The image processing device according to claim 1 wherein the at least one processor is configured to:
learn the global and the local models by one or more series of training images and shapes which are given as true shapes.

4. The image processing device according to claim 1, wherein the initial shape is an estimated shape derived from a previous image of the target image.

5. The image processing device according to claim 1, wherein the shape and the sub parts are represented by position information of the feature points.

6. An image processing method comprising:
extracting features of an object from a target image comprising the object based on a shape representing the object, the shape including sub parts, each sub part being a group of feature points, each feature point being correlated with a position within the object;
deriving an estimated shape for the object by applying a global model to an initial shape within the target image, the global model representing a relation between one of the features extracted and a motion of the initial shape within the target image;
detecting, in the sub parts, an occluded sub part by comparing the estimated shape for the object to an estimated shape for the object derived from an image previous to the target image;
selecting a local model to be applied to the occluded sub part that restricts the motion of the occluded sub part, wherein the local model represents a relation between the features and a motion of the occluded sub part of the sub parts and restricts a motion of at least one of the sub parts, and generate a final output shape by combining an estimated shape that is derived by applying the selected local model to the occluded sub part and the estimated shape derived for the object by applying the global model.

7. A non-transitory computer-readable medium storing a program that causes a computer to execute:

feature extraction processing of extracting features of an object from a target image comprising the object based on a shape representing the object, the shape including sub parts, each sub part being a group of feature points, each feature point being correlated with a position within the object;

alignment processing of deriving an estimated shape for the object by applying a global model to an initial shape within the target image, the global model representing a relation between one of the features extracted and a motion of the initial shape within the target image;

occlusion detection processing of detecting, in the sub parts, an occluded sub part by comparing the estimated shape for the object and to an estimated shape for the object derived from an image previous to the target image;

estimation processing of selecting a local model to be applied to the occluded sub part that restricts the motion of the occluded sub part, wherein the local model represents a relation between the features and a motion of the occluded sub part of the sub parts and restricts a motion of at least one of the sub parts; and generate a final output shape by combining an estimated shape that is derived by applying the selected local model to the occluded sub part and the estimated shape derived for the object by applying the global model.

8. The non-transitory computer-readable medium according to claim 7, wherein the alignment processing sets the initial shape as a first start shape, and derive the estimated shape by repetition of calculating a motion of a start shape by applying the global model to the features extracted from the image based on the start shape, and setting, as a next start shape, an incremental shape where the motion calculated is added to the start shape.

9. The non-transitory computer-readable medium according to claim 7, storing a program that causes a computer to operate as:

learning processing of learning the global and the local models by one or more series of training images and shapes which are given as true shapes.

10. The non-transitory computer-readable medium according to claim 7, wherein the initial shape is an estimated shape derived from a previous image of the target image.

* * * * *